United States Patent [19]
Hilmer

[11] 3,718,317
[45] Feb. 27, 1973

[54] PORTABLE HAND WINCH AND ANCHORING AND STABILIZING MEANS

[76] Inventor: Elwyn P. Hilmer, 3028 Valmont Avenue, Boulder, Colo.

[22] Filed: Jan. 27, 1971

[21] Appl. No.: 110,061

[52] U.S. Cl. ........254/186 HC, 254/150 R, 280/511, 280/480
[51] Int. Cl. ..............................B66d 1/00
[58] Field of Search ....254/150, 186 HC; 287/87, 21; 296/512; 280/482, 511, 480

[56] References Cited

UNITED STATES PATENTS

| | | | |
|---|---|---|---|
| 2,397,964 | 4/1946 | Hiniker | 280/482 |
| 2,818,276 | 12/1957 | Sprang | 280/482 |
| 2,992,832 | 7/1961 | Robinson | 280/511 X |
| 3,051,446 | 8/1962 | Nelson et al. | 254/186 HC |
| 3,159,368 | 12/1964 | Ahlbin et al. | 254/150 |
| 3,233,913 | 2/1966 | Brown | 280/480 X |
| 3,265,407 | 8/1966 | Paddock | 280/480 X |
| 3,428,336 | 2/1969 | Thurman | 280/482 |

*Primary Examiner*—Evon C. Blunk
*Assistant Examiner*—Merle F. Maffei
*Attorney*—Charles L. Lovercheck

[57] ABSTRACT

The specification discloses a combination ball and loop with a hand winch. The hand winch is provided with an anchor means. The anchoring means is made up of a bar and loop at the end of the bar. The winch is attached to one end of the bar and a female trailer hitch is mounted on the other end of the bar. A ball is attached to a U-shaped loop by means of a plate which closes the legs of the loop. The trailer hitch ball is supported on the plate. The ball is received in the female trailer hitch member. To stabilize the winch, a handle is attached to the bar and winch. The handle is used to hold the winch and bar from twisting laterally and to stabilize it while the crank is being turned. A cable is attached to the loop which may be used for anchoring the winch to a tree or other object.

4 Claims, 4 Drawing Figures

PATENTED FEB 27 1973　　　　　　　　　　　3,718,317

Inventor
ELWYN P. HILMER
By Charles L. Lovercheck
Attorney

PORTABLE HAND WINCH AND ANCHORING AND STABILIZING MEANS

OBJECTS OF THE INVENTION

It is an object of the invention to provide an improved portable winch and anchoring means.

Another object of the invention is to provide a combination winch and anchoring means which is simple in construction, economical to manufacture, and simple and efficient to use.

Another object of the invention is to provide an improved hand winch and trailer hitch combination with a ball and loop assembled to connect the trailer hitch to an anchoring means.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DETAILED DESCRIPTION OF THE DRAWINGS

Figure 3:
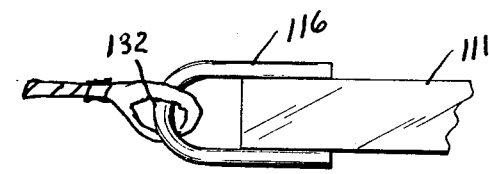
FIG. 3 is a top partial view of another embodiment of the invention.

Now with more particular reference to the drawings, the hand winch is shown generally at 10. It is of a conventional design of hand winch. It is provided with a bar 11 which is attached to the bottom 24 of the winch frame 20 by means of suitable bolts. The winch frame 20 has a bottom 24 and upwardly extending sides 25 and 26 which receive the spool 27 for an axle therebetween in a conventional manner. The spool 27 has a ring gear 28 on one side which meshes with a sprocket 29. Sprocket 29 is connected through reduction gears to the crank 19.

The bar 11 may be in the form of a bar or channel iron of sufficient rigidity to avoid bending when the hitch is connected to the anchoring means. The bar 11 has the female trailer hitch 12 attached to it by means of bolts 13. The female trailer hitch 12 is of a type that is familiar to those skilled in the art and has a latch member 17 of a conventional type for attaching the female trailer hitch to a hitch ball. The hitch ball 14 is of the type that is frequently used in connection with automobile trailers and has a nut 30 received on the threaded end which attaches the hitch ball to the transverse bar member 15 which is welded to the ends 31 of the loop 16.

The loop 16 may be made of a round rod of sufficient strength and could be, for example, a rod ⅜ inch in diameter. The cable 18 will be of sufficient strength for the duty required and it will have a hook 21 on its end for connecting it to the load to be moved.

The loop 16 may be slipped over the trailer hitch ball on an automobile, truck or other towing vehicle. Then the female trailer hitch 12 may be connected to the ball attached to the vehicle trailer hitch.

Cable 32 is attached to loop 16 by a conventional swaged connection. It has hook 31 on it and the ball and loop when attached to the coupler member 12 may be attached to chain or cable 32 when winching from a tree, post, stake or rock.

Figure 4:
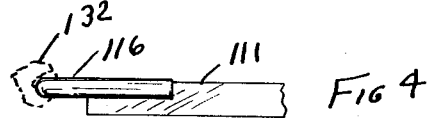
FIG. 4 is a side view of the embodiment of FIG. 3.
Figure 1:
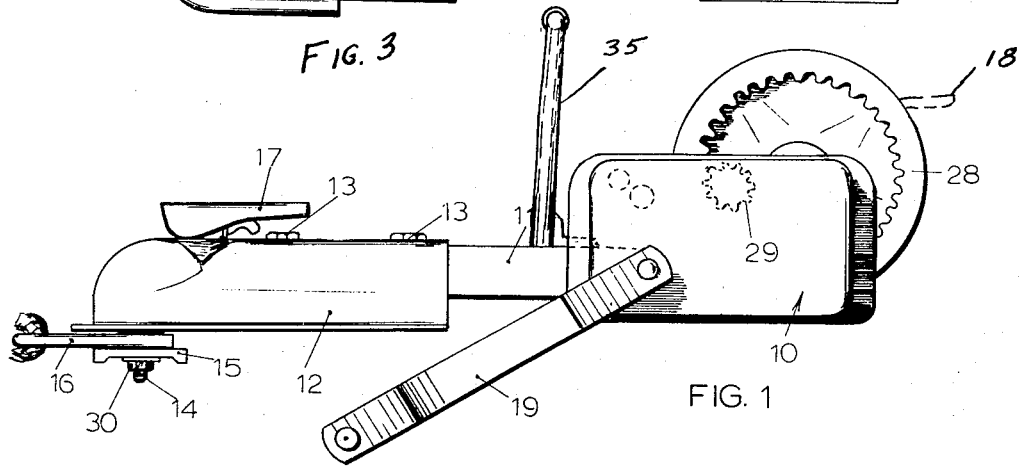
FIG. 1 is a side view of the combination according to the invention.
Figure 2:
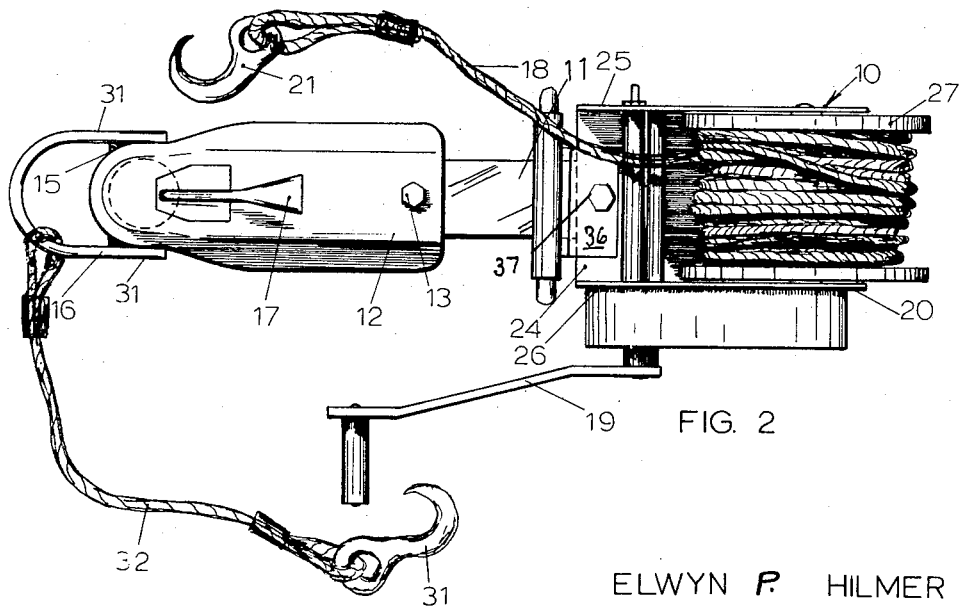
FIG. 2 is a top view of the combination shown in FIG. 1.

In the embodiment of the invention shown in FIGS. 3 and 4, the bar 111 has the U-shaped loop 116 attached directly to the forward end of the bar 111. The legs of the loop 116 receive the front end of the bar and leave a space to receive the end of the cable 132. The cable 132 will be attached to the loop 116 in the same manner that the cable 32 is attached to the loop 16 in the embodiment of FIG. 2.

The handle 35 has its lower ends fixed to the angle iron 36. The angle iron 36 is fixed to the winch frame by means of the bolt 37. The handle 35 may be grasped by the operator to prevent the winch from twisting laterally and destabilizing it while the crank 19 is being turned.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, one member consisting of a winch, having a first cable wound thereon a bar having two ends, said winch being fixed to one end of said bar, a female ball receiving member fixed to the end of said bar opposite said winch, a second member consisting of a ball, a second cable and a loop, means rigidly fixing said ball to said loop, said second cable being secured at one end to said loop and having a hook at its other end, said ball being removably received in said female member, and latch means on said female member for selectively preventing the removal of said ball from said female member, and a handle fixed to said bar and extending upwardly therefrom whereby said winch can be stabilized when said winch is in operation.

2. The combination recited in claim 1 wherein said handle is attached to said bar adjacent said winch.

3. The combination recited in claim 2 wherein said handle has vertically extending legs fixed to said bar and extends upwardly therefrom, and said handle terminates in a horizontal member disposed above said winch.

4. The combination recited in claim 3 wherein said winch has a cable winding attachment and a hand engaging handle connected to said cable winding attachment.

* * * * *